US012621369B2

(12) United States Patent
Papageorgiou et al.

(10) Patent No.: US 12,621,369 B2
(45) Date of Patent: May 5, 2026

(54) HANDLING TIMEOUTS OF CLIENT REQUESTS TO A SERVER

(71) Applicant: INTERNATIONAL BUSINESS MACHINES CORPORATION, Armonk, NY (US)

(72) Inventors: Anthony Philip Papageorgiou, Winchester (GB); Ian Mark Hodges, Horton Heath (GB); Andrew Alan Armstrong, Edinburgh (GB)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 18/741,241

(22) Filed: Jun. 12, 2024

(65) Prior Publication Data

US 2025/0358346 A1 Nov. 20, 2025

(30) Foreign Application Priority Data

May 16, 2024 (GB) ...................................... 2406945

(51) Int. Cl.
H04L 67/62 (2022.01)
H04L 9/40 (2022.01)
(52) U.S. Cl.
CPC .............. H04L 67/62 (2022.05); H04L 63/08 (2013.01)
(58) Field of Classification Search
CPC ......... H04L 67/62; H04L 63/08; G06F 9/546; G06F 2209/541; G06F 9/54
See application file for complete search history.

(56) References Cited

U.S. PATENT DOCUMENTS

| | | | |
|---|---|---|---|
| 7,603,476 | B1 | 10/2009 | Hofmann |
| 7,941,578 | B2 | 5/2011 | Kimoto |
| 8,307,031 | B1 | 11/2012 | Grieve |

(Continued)

FOREIGN PATENT DOCUMENTS

| | | |
|---|---|---|
| CN | 116506332 A | 7/2023 |
| CN | 116828533 A | 9/2023 |

(Continued)

OTHER PUBLICATIONS

"The TCP/IP Guide—TCP Connection Termination," www.tcpipguide. com, printed from the internet Oct. 10, 2023, 3 pages.

(Continued)

*Primary Examiner* — Soe Hlaing
(74) *Attorney, Agent, or Firm* — Kimberly Zillig

(57) ABSTRACT

A method and computer system for handling timeouts of client requests to a server. The method includes: accessing timeout metadata of a synchronous client request at a server queue; determining that the synchronous client request has a timeout risk; identifying a response storage location for a request processor to use to store a response to the synchronous client request when the response is provided after the timeout of the synchronous client request; responding to the synchronous client request indicating a user of a response storage location for asynchronous response retrieval; and providing the identifier of the response storage location as metadata in the synchronous client request when sending the synchronous client request to the request processor for processing.

19 Claims, 5 Drawing Sheets

(56)                References Cited

U.S. PATENT DOCUMENTS

| | | | |
|---|---|---|---|
| 9,430,280 B1 | 8/2016 | Shih | |
| 9,507,627 B2 | 11/2016 | Fee | |
| 10,402,375 B2 * | 9/2019 | Jain | H04L 67/1097 |
| 2002/0188596 A1 * | 12/2002 | Tanaka | G06F 16/951 |
| | | | 707/E17.081 |
| 2003/0149723 A1 * | 8/2003 | Zhao | G06F 9/54 |
| | | | 709/203 |
| 2005/0198190 A1 | 9/2005 | Zavalkovsky et al. | |
| 2008/0189350 A1 * | 8/2008 | Vasa | H04L 67/1008 |
| | | | 709/201 |
| 2012/0233287 A1 | 9/2012 | Queru et al. | |
| 2014/0372516 A1 | 12/2014 | Watte | |
| 2016/0080273 A1 | 3/2016 | Yang | |
| 2016/0094640 A1 | 3/2016 | Baldwin | |
| 2016/0248836 A1 | 8/2016 | Agarwal | |
| 2017/0147395 A1 | 5/2017 | Bates | |
| 2018/0357291 A1 * | 12/2018 | Choi | G06F 16/2379 |
| 2019/0068751 A1 * | 2/2019 | Brooks | G06F 9/5027 |
| 2025/0119483 A1 | 4/2025 | Papageorgiou et al. | |

FOREIGN PATENT DOCUMENTS

| | | | |
|---|---|---|---|
| EP | 2627057 A1 | 8/2013 | |
| GB | 2634323 A | 4/2025 | |
| GB | 2641097 A | 11/2025 | |
| JP | 2011095869 A | 5/2011 | |
| WO | 2005065261 B1 | 7/2005 | |

OTHER PUBLICATIONS

Author Unknown, "Asynchronous Request-Reply pattern—Azure Architecture Center—Microsoft Learn," printed from the internet Jun. 12, 2024, 12 pages.

Great Britain Search Report for Application No. GB2315387.7, Filing Date: Oct. 6, 2023, Mailing Date of Report: Mar. 20, 2024, 3 pages.

IBM: List of IBM Patents or Patent Applications Treated as Related. Filed Herewith. 2 pages.

Papageorgiou et al., "Server Queue Management," Application and Drawings, filed Nov. 6, 2023, 31 pages, U.S. Appl. No. 18/502,278.

International Searching Authority, "Notification of Transmittal of the International Search Report and the Written Opinion of the International Searching Authority, or Declaration," Patent Cooperation Treaty Jul. 14, 2025, 13 pages, International Application No. PCT/ EP2025/061671.

Intellectual Property Office, Patents Act 1977: Search Report under Section 17(5), Dec. 24, 2024, 3 Pages, GB Application No. 2406945. 2.

* cited by examiner

100

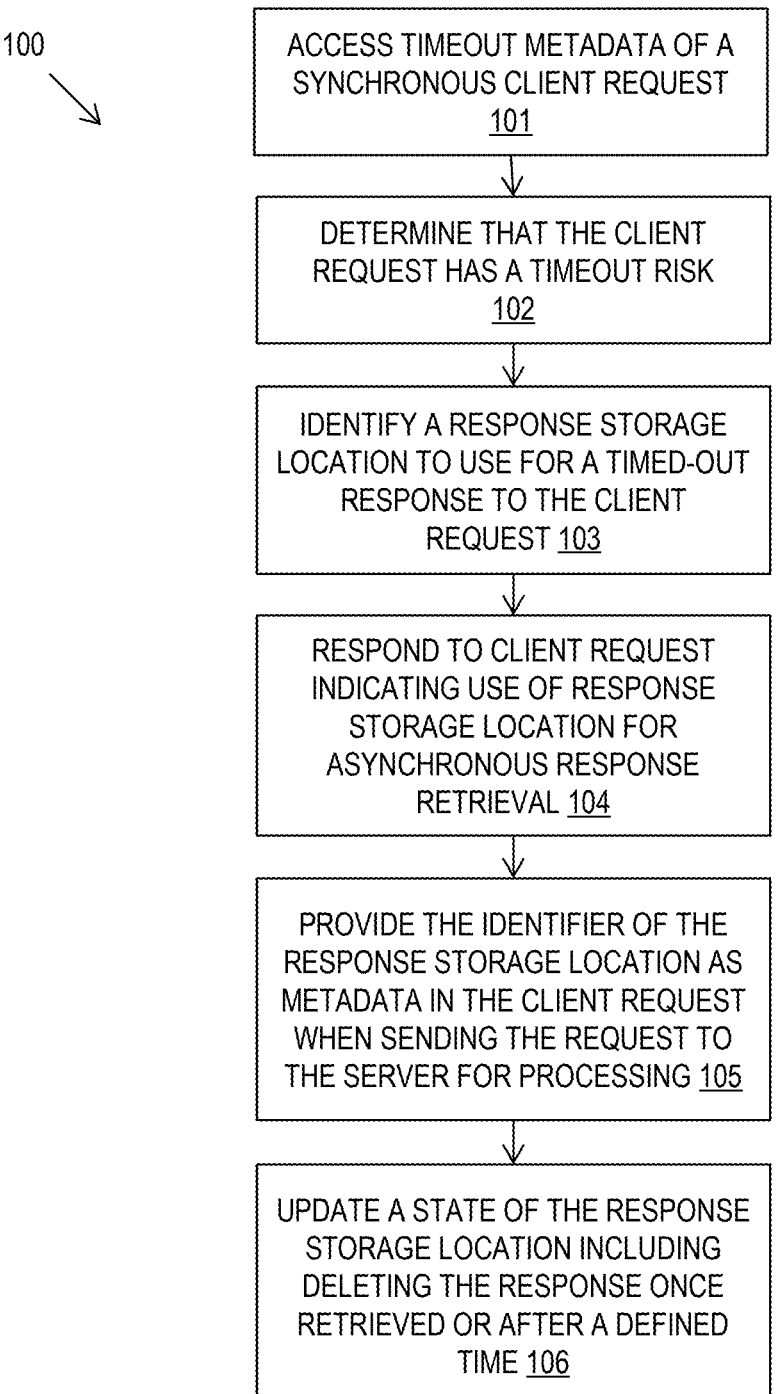

ACCESS TIMEOUT METADATA OF A
SYNCHRONOUS CLIENT REQUEST
101

DETERMINE THAT THE CLIENT
REQUEST HAS A TIMEOUT RISK
102

IDENTIFY A RESPONSE STORAGE
LOCATION TO USE FOR A TIMED-OUT
RESPONSE TO THE CLIENT
REQUEST 103

RESPOND TO CLIENT REQUEST
INDICATING USE OF RESPONSE
STORAGE LOCATION FOR
ASYNCHRONOUS RESPONSE
RETRIEVAL 104

PROVIDE THE IDENTIFIER OF THE
RESPONSE STORAGE LOCATION AS
METADATA IN THE CLIENT REQUEST
WHEN SENDING THE REQUEST TO
THE SERVER FOR PROCESSING 105

UPDATE A STATE OF THE RESPONSE
STORAGE LOCATION INCLUDING
DELETING THE RESPONSE ONCE
RETRIEVED OR AFTER A DEFINED
TIME 106

*FIG. 1*

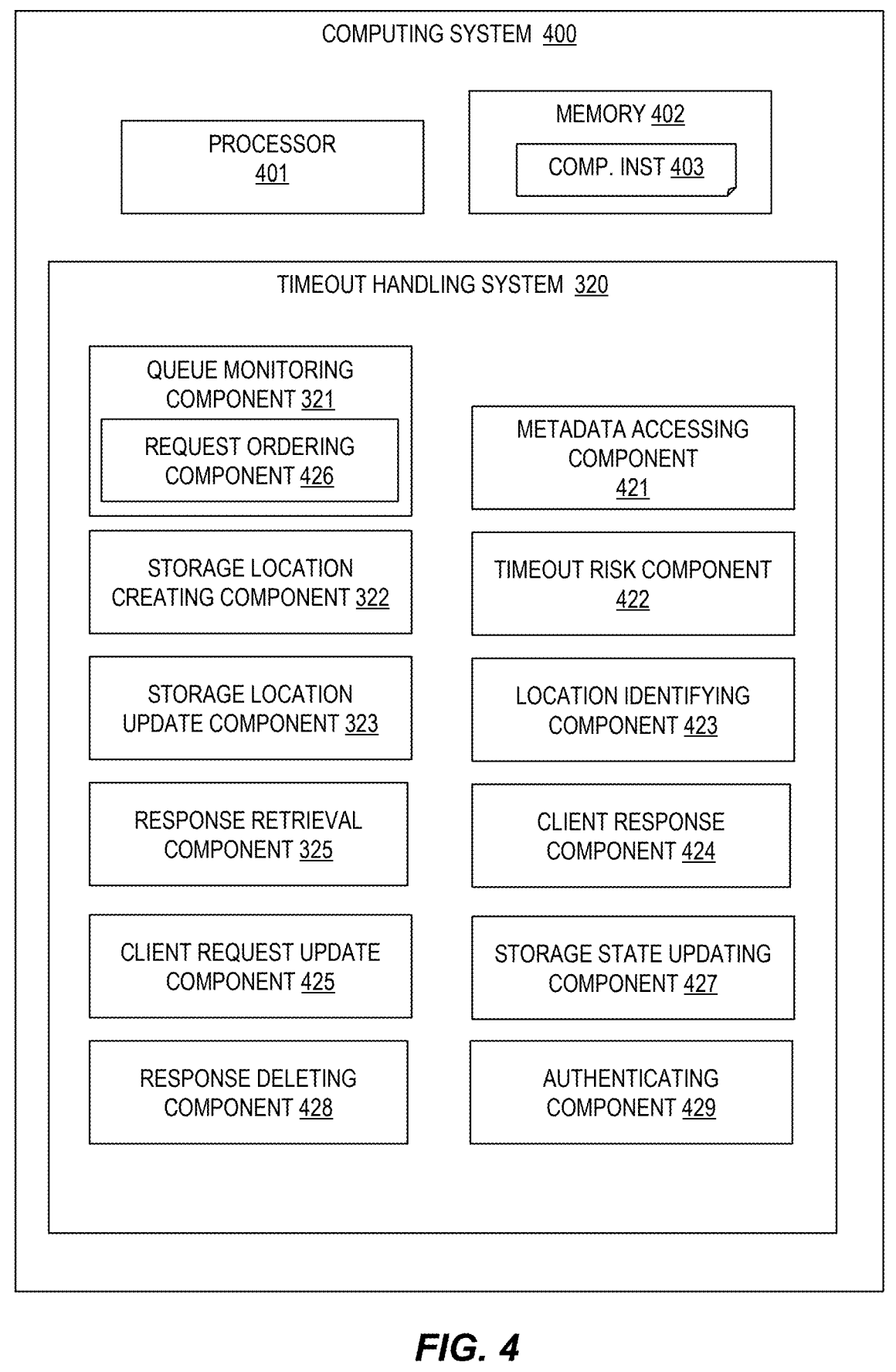

COMPUTING SYSTEM 400

PROCESSOR
401

MEMORY 402

COMP. INST 403

TIMEOUT HANDLING SYSTEM 320

QUEUE MONITORING
COMPONENT 321

REQUEST ORDERING
COMPONENT 426

METADATA ACCESSING
COMPONENT
421

STORAGE LOCATION
CREATING COMPONENT 322

TIMEOUT RISK COMPONENT
422

STORAGE LOCATION
UPDATE COMPONENT 323

LOCATION IDENTIFYING
COMPONENT 423

RESPONSE RETRIEVAL
COMPONENT 325

CLIENT RESPONSE
COMPONENT 424

CLIENT REQUEST UPDATE
COMPONENT 425

STORAGE STATE UPDATING
COMPONENT 427

RESPONSE DELETING
COMPONENT 428

AUTHENTICATING
COMPONENT 429

FIG. 4

HANDLING TIMEOUTS OF CLIENT REQUESTS TO A SERVER

BACKGROUND

The present invention relates to handling client requests to a server, and more specifically, to handling timeouts of client requests to a server.

When possible synchronous interactions between a client and server are generally preferred to asynchronous interactions. Synchronous interactions only require one network request whereas asynchronous interactions require multiple network requests. Synchronous client server application models include Representational State Transfer (RESTful) application programming interfaces (APIs).

Commonly, servers may have a limit on the number of client requests that can be processed in parallel, and servers may queue incoming client requests. Server queues present a strategy for coping with busy periods and client requests are held in the queue until the server has sufficient resources available to process them. The server queue may become so large, or delays may occur at the server side such that client requests may timeout before the requests reach the front of the queue.

In existing solutions for synchronous interactions, it is complex for applications to recover when client requests timeout due to heavy server traffic or too short client timeout periods. This difficulty results in application complexity, excess server workload due to retries, and business level problems which have costs, risks, and damage to infrastructure.

SUMMARY

According to an aspect of the present invention there is provided a computer-implemented method for handling timeouts of client requests to a server, said method carried out by a server comprising: accessing timeout metadata of a synchronous client request at a server queue; determining that the client request has a timeout risk; identifying a response storage location for a request processor to use to store a response to the client request when the response is provided after the timeout of the client request; responding to the client request indicating a use of a response storage location for asynchronous response retrieval; and providing the identifier of the response storage location as metadata in the client request when sending the client request to the request processor for processing.

This method has the advantage of using synchronous response patterns until such time as there is a timeout risk for a client and then moving to an asynchronous response pattern with the response payload being provided at a response storage location accessible to the request processor and the client.

According to another aspect of the present invention there is provided a computer-implemented method for handling timeouts of client requests to a server, said method carried out at a client comprising: sending a synchronous client request to a server queue, wherein the client request includes timeout metadata; receiving a holding response to the client request, with the holding response including an indication of the use of a response storage location for the server to use to store a response to the client request when the response is provided after the timeout of the client request; obtaining an identifier of the response storage location; and accessing the response storage location for asynchronous response retrieval.

According to a further aspect of the present invention there is provided a server system for handling timeouts of client requests to a server, comprising: a processor and a memory configured to provide computer program instructions to the processor to execute a method of: accessing timeout metadata of a synchronous client request at a server queue; determining that the client request has a timeout risk; identifying a response storage location for a request processor to use to store a response to the client request when the response is provided after the timeout of the client request; responding to the client request indicating a user of a response storage location for asynchronous response retrieval; and providing the identifier of the response storage location as metadata in the client request when sending the client request to a request processor for processing.

According to a further aspect of the present invention there is provided a client system for handling timeouts of client requests to a server, comprising: a processor and a memory configured to provide computer program instructions to the processor to execute a method of: sending a synchronous client request to a server queue, wherein the client request includes timeout metadata; receiving a holding response to the client request, with the holding response including an indication of the use of a response storage location for a request processor to use to store a response to the client request when the response is provided after the timeout of the client request; obtaining an identifier of the response storage location; and accessing the response storage location for asynchronous response retrieval.

According to a further aspect of the present invention there is provided a computer program product for handling timeouts of client requests to a server, the computer program product comprising a computer readable storage medium having program instructions embodied therewith, the program instructions executable by a processor to cause the processor to: access timeout metadata of a synchronous client request at a server queue; determine that the client request has a timeout risk; identify a response storage location for a request processor to use to store a response to the client request when the response is provided after the timeout of the client request; respond to the client request indicating a user of a response storage location for asynchronous response retrieval; and provide the identifier of the response storage location as metadata in the client request when sending the client request to the request processor for processing.

According to a further aspect of the present invention there is provided a computer program product for handling timeouts of client requests to a server, the computer program product comprising a computer readable storage medium having program instructions embodied therewith, the program instructions executable by a processor to cause the processor to: send a synchronous client request to a server queue, wherein the client request includes timeout metadata; receive a holding response to the client request, with the holding response including an indication of the use of a response storage location for the server to use to store a response to the client request when the response is provided after the timeout of the client request; obtain an identifier of the response storage location; and access the response storage location for asynchronous response retrieval.

The computer readable storage medium may be a non-transitory computer readable storage medium, and the computer readable program code may be executable by a processing circuit.

BRIEF DESCRIPTION OF THE DRAWINGS

Embodiments of the present invention will now be described, by way of example only, with reference to the accompanying drawings:

FIG. 1 is a flow diagram of an example embodiment of a method in accordance with embodiments of the present invention;

FIG. 4 is a block diagram of an example embodiment of a system in accordance with embodiments of the present invention.

Figure 2:
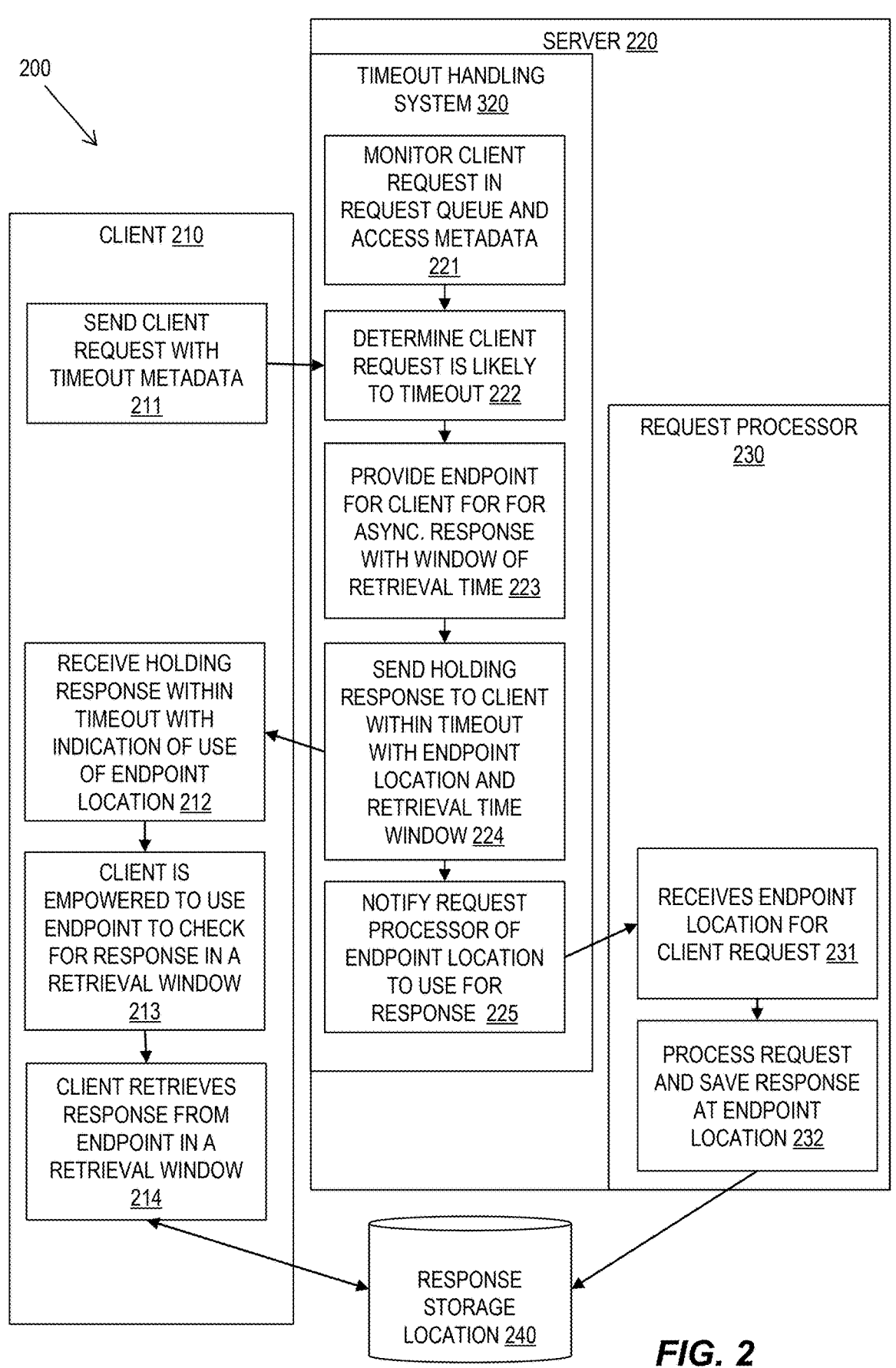
FIG. 2 is a flow diagram of another example embodiment of a method in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for handling timeouts of client requests to a server. The method at the server operates by monitoring client requests at a server queue. The method focuses on client requests that are about to timeout and provides a temporary endpoint that the client can use to retrieve the original response asynchronously.

For a client request, the method accesses timeout metadata of a synchronous client request at the server queue and determines that the client request has a timeout risk. The method identifies a response storage location for the request processor to use to store a response to the client request when the response is provided after the timeout of the client request to allow asynchronous response retrieval by the client. An identifier of the response storage location is provided to the client and to the request processor.

The handling of timeouts of client request is an improvement in the technical field of client server processing generally and more particularly in the technical fields of transaction reliability and security.

The described method enables a server to use a synchronous response pattern when it can be provided within a client's timeout, while providing failover to an asynchronous response pattern when the server is not able to provide a response within the client's timeout.

This provides the advantage of using synchronous interactions when possible while negating the timeout failure scenarios associated with synchronous interactions. Additionally, as clients will more reliably receive a response (even in a timeout failure scenario), they will not need to retry requests, which will alleviate server load during busy periods.

Referring to FIG. 1, a flow diagram 100 shows an example embodiment of the described computer-implemented method as carried out at one or more servers. The method may handle timeouts of client requests to the server by monitoring client requests in the server queue. For a client request, the following method may be carried out.

The method may access 101 timeout metadata of a synchronous client request at the server queue. The method may determine 102 that the client request has a timeout risk. The determining that the client request has a timeout risk may analyze a current server response capability in order to determine if the client request is likely to be processed within the remaining time of its timeout time limit.

The method may identify 103 a response storage location for a request processor to use to store a response to the client request when the response is provided after the timeout of the client request. The method may include creating the response storage location as an endpoint with the client's credentials for authentication of the client when retrieving the response. The response storage location may be provided on a separate server to a request processing server. The identifier of the response storage location may be a Uniform Resource Identifier (URI) that identifies the physical resource location.

The method may respond 104 to the client request indicating the use of a response storage location. This may include responding to the client request with an identifier of the response storage location for asynchronous response retrieval. Such a response may be in the form of a request error response indicating that the client request is about to timeout and including the storage location identifier. Alternatively, the response storage location may be derived by the client from an application programming interface (API) specification that states how to derive the location in the event of a timeout error response.

The method may provide 105 the identifier of the response storage location as metadata in the client request when sending this to the request processor for processing.

The method may update 106 a state of the response storage location including one or multiple different states of a response at the response storage location. For example, the states may be: awaiting response to be stored, response ready for retrieval, and response expired without retrieval. The response may be deleted from the response storage location once retrieved by the client or after a predetermined time at which it expires.

The described method uses shared timeout metadata of a client request to drive further functionality to result in an endpoint being established for a client when their client request is approaching timeout. This allows the client to return at a later time to recover the original response which was missed in original exchange. The original response is populated in the endpoint by the server once processing the client request completes.

The method keeps track of which clients will timeout and when and therefore knows which client requests are likely to timeout. Timeouts may be because the server is suffering significant workload, or may be during problem scenarios causing responses to be slow. The server, after identifying a client request which is about to timeout, may create an endpoint specifically for this particular client and/or client request. The server, once it reaches the point of processing the original request, can store the response payload at this endpoint location.

The client is sent or is able to derive the intended location in an error response to the original client request, before the request times out. The client is then empowered to use this endpoint to check for its response in a dynamic window of opportunity. The dynamic window is the period during which the response payload is available at the endpoint and control when the response payload is deleted. The period may be a set time limit during which the response payload is available. The period may be based on the amount of storage remaining at the response storage location (for example, removing old response payloads when space required) or based on a number of response payloads stored at the location (for example, only holding the last 10,000).

Without this solution, when a client request times out, the client does not receive the original information in the form that it would have received had it not timed out. However, with this solution, the client request has a proactively shared endpoint as an asynchronous safety response payload which empowers the client to automatically use this to locate the original response to the client request at a timepoint in the future.

Referring to FIG. 2, a flow diagram 200 shows another example embodiment of the described method. The flow diagram 200 is a swim-lane flow diagram showing the interaction of a client 210 with a server 220 including a request processor 230 at or accessed via the server 220. The described method of FIG. 2 may also reference the example embodiment of a system shown in FIG. 3.

Figure 3:
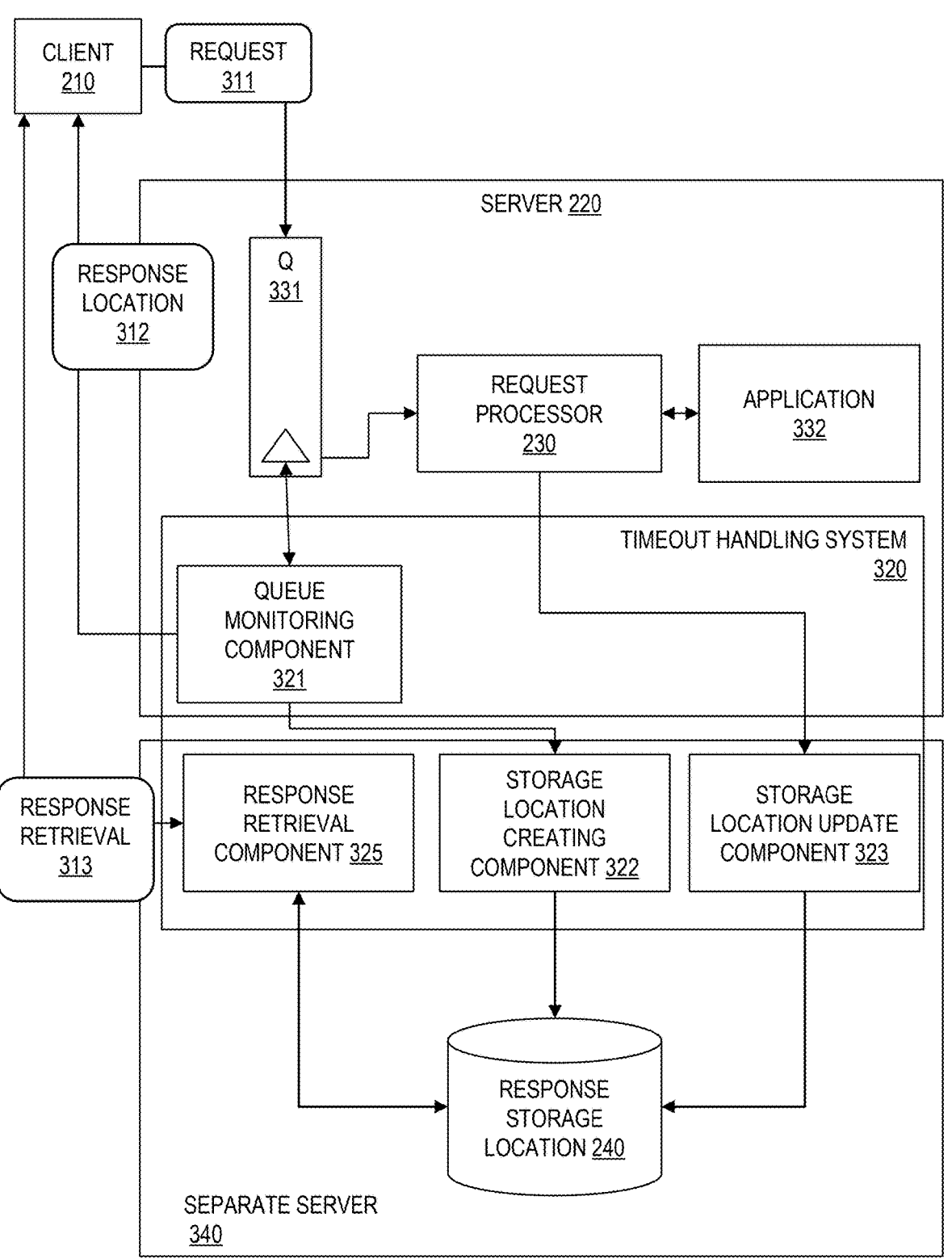
FIG. 3 is a schematic diagram of an example embodiment of a system in accordance with embodiments of the present invention.

A timeout handling system 320 is provided at the server 220 and some of the processing of the timeout handling system 320 may be handed off to a separate server 340 (shown in FIG. 3). Some of the functionality of the timeout handling system 320 may be provided in a separate server 340 that may host the response storage location 240. As the server 220 that has the request processor 230 may be under stress, the queue monitoring component 321 of the timeout handling system 320 may hand off the work to the separate server 340.

The method at the server 220 carried out by the timeout handling system 320 may monitor 221 client requests 311 in a request queue 331 of the server 220 and may access timeout metadata of the client requests 311.

Timeout metadata may comprise at least one of an absolute time or a duration. The timeout metadata may provide a request specific measure of the time period for which the client will remain waiting for a response to the request. This information may be stored in a header of the request.

The time left before a client request timeout may be determined by analyzing a current server response capability and comparing this to the remaining time of the client's timeout time limit. This may involve determining an application 332 for processing the request 311 and analyzing the application 332 to determine an impact of processing the request on a system state. For example, the impact of processing the request on the system state may be at least one of: modifying data; adding data; removing data; and reading data.

A queue monitoring component 321 of the timeout handling system 320 may be a high priority queue monitoring thread that may monitor the request queue 331. The queue monitoring component 321 may create a view of the request queue 331 based on time left before the requesting client 210 times out.

US20170147395A1 discloses a method for holding a view of a queue ordered by time left before timeout and the disclosure of this document is incorporated by reference. Various methods may be used to maintain and order the queue by time remaining. One method is to use client timeout metadata on the client request to calculate the absolute client timeout time and insert the request into a queue of all requests ordered on that timeout time. This way the request at the head of the queue is always the next closest to having its client timeout and can be checked and actioned by the server without having to scan all requests in the queue. Some method may be based on the workload of a queued task.

Multiple different clients 210 may each send 211 a client request 311 with timeout metadata. One of these client requests 311 is used as an ongoing example. The queue monitor thread may work down the request queue 331 looking for a request that has a client that will timeout soon and is unlikely to be processed before that timeout. The method may determine 222 that the received client request 311 is likely to timeout.

The timeout handling system 320 may provide 223 a response storage location 240 in the form of an endpoint for the client 210 and for the request processor 230 to use to provide a delayed response asynchronously with a window of retrieval time. The response storage location 240 at the endpoint may be identified 312 by a Uniform Resource Identifier (URI) that identifies the physical resource and is referred to here as the Playback URI.

When such a client request 311 that is timing-out is found, a storage location creating component 322 creates a Playback URI. This URI may be for a separate host. The URI may be unique and associated for that specific client request 311. The Playback URI is attached to the client request metadata.

The timeout handling system 320 may send 224 a holding response to the client 210 within the timeout. The holding response may indicate a user of a response storage location. This indication may be by providing an identifier of the response storage location in the response. Alternatively, the client may use an API specification to derive the response storage location. In both cases, the client obtains the identifier of the response storage location. The identifier of the response storage location at the endpoint may be in the form of the Playback URI. The holding response may be an error response indicating the timeout.

When the client 210 receives 212 the error response, the Playback URI is noted and is used by the client 210 in the future to retrieve and replay the stored response. In this way, the client is empowered 213 to use the endpoint to check for the response in the retrieval window. The client 210 may attempt to retrieve the response immediately but would probably get an "Awaiting Response" state from the Playback URI. The client 210 may try at repeated times to retrieve 214 the response. A response retrieval component 325 of the timeout handling system 320 may process the response retrieval 313 from the response storage location 240.

The response storage location entity may be created on the separate server 340 with a request from the storage location creating component 322 passing the Playback URI and client credentials. The response storage location entity may be initially set with a state "Awaiting Response".

When the request processor 230 at the server 220 is ready to process the client request 311, the client request is fetched from the server queue 331 with the Playback URI attached to the client request metadata. This notifies 225 the request processor 230 of the endpoint location to use for the response as the response to the client has timed out.

The request processor 230 receives 231 and notes the request has a Playback URI and processes 232 the request and saves the response to the response storage location 240 using a storage location update component 323. Rather than sending the response to the client 210, the request processor 230 makes an update to the Playback entity via a request to the Playback server passing Playback URI and application response). Playback response state is then set to "Ready".

The client 210 must pass authentication on the Playback server to get Playback of the response. The Playback response may be deleted once successfully retrieved 214 by the client 210. The Playback response is exactly the same as if the processing server had responded directly to the client 210.

The response storage location server may monitor its Playback entities. If a Playback entity is in a state "Waiting Response" for greater than a defined number of minutes, the state is set to "Response Not Received". If the response is not replayed after a defined number of hours, the response may be removed while keeping the Playback entity for its URI and updating the state to "Expired". If the Playback entity is a defined number of days old, the Playback entity may be removed.

The method is based on the client having sent an intended client timeout time with the client request. This information is then used by the server to identify cases of high likelihood that the client will timeout and to send the client a Playback URI pointing to the location where the response will be stored. This allows the client's application and threads to continue operation, helping with performance. This also allows the server to free held resources in the request queue to focus more on server logic workload. The outcome is clients are able to retrieve the original response from a dynamically created Playback URI. This removes the added overhead of handling a timeout and having to repeat the original request again providing yet more traffic to an already pressured server system.

Referring to FIG. 4, a block diagram shows a computing system 400 on which the described system may be implemented. The computing system 400 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The computing system 400 may be a server system (including one or more servers) including a timeout handling system 320 for handling timeouts of client requests to the server system.

The timeout handling system 320 may include the components as described in relation to FIG. 3 of the queue monitoring component 321, storage location creating component 322, storage location update component 323 for updating by the request processor, and response retrieval component 325 for retrieval of a response by the client.

The queue monitoring component 321 may include a request ordering component 426 for ordering the client requests in the queue based on the time remaining until each request timeouts.

The storage location creating component 322 may create the response storage location with an authentication requirement for authentication of the client when retrieving the response. The authentication requirement may use the client credentials used in the original client request. The response storage location may be provided on a separate server to a request processing server in order to use separate processing resources in the event that the request processing server is under stress. Alternatively, a single server may be used.

The timeout handling system 320 may include a metadata accessing component 421 for accessing timeout metadata of a synchronous client request at a server queue. The timeout handling system 320 may include a timeout risk component 422 for determining that the client request has a timeout risk which may include analyzing a current server response capability.

The timeout handling system 320 may include a location identifying component 423 that may identify a response storage location for the request processor to use to store a response to the client request for use when the response is provided after the timeout of the client request. The location identifying component 423 may work in association with the storage location creating component 322 to identify a created location.

The timeout handling system 320 may include a client response component 424 for responding to the client request with a holding response that may include an identifier of the response storage location for asynchronous response retrieval. Alternatively, the holding request may indicate that a response storage location is to be used and an API specification may be used by the client to derive the location.

The timeout handling system 320 may include a client request update component 425 for providing the identifier of the response storage location with the client request to the request processor for processing.

The timeout handling system 320 may include a storage state updating component 427 for updating a state of the response storage location between states of: awaiting response to be stored, response ready for retrieval, and response expired without retrieval.

The timeout handling system 320 may include a response deleting component 428 for deleting the response from the response storage location after a predetermined time or once retrieved by the client.

The timeout handling system 320 may include an authenticating component 429 for authenticating a client before allowing retrieval of the response from the response storage location.

The client response component 423 may be provided at a client computer system and may include functionality for accessing the response storage location for asynchronous response retrieval including repeatedly attempting to retrieve the response from the response storage location until it is available at the response storage location.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
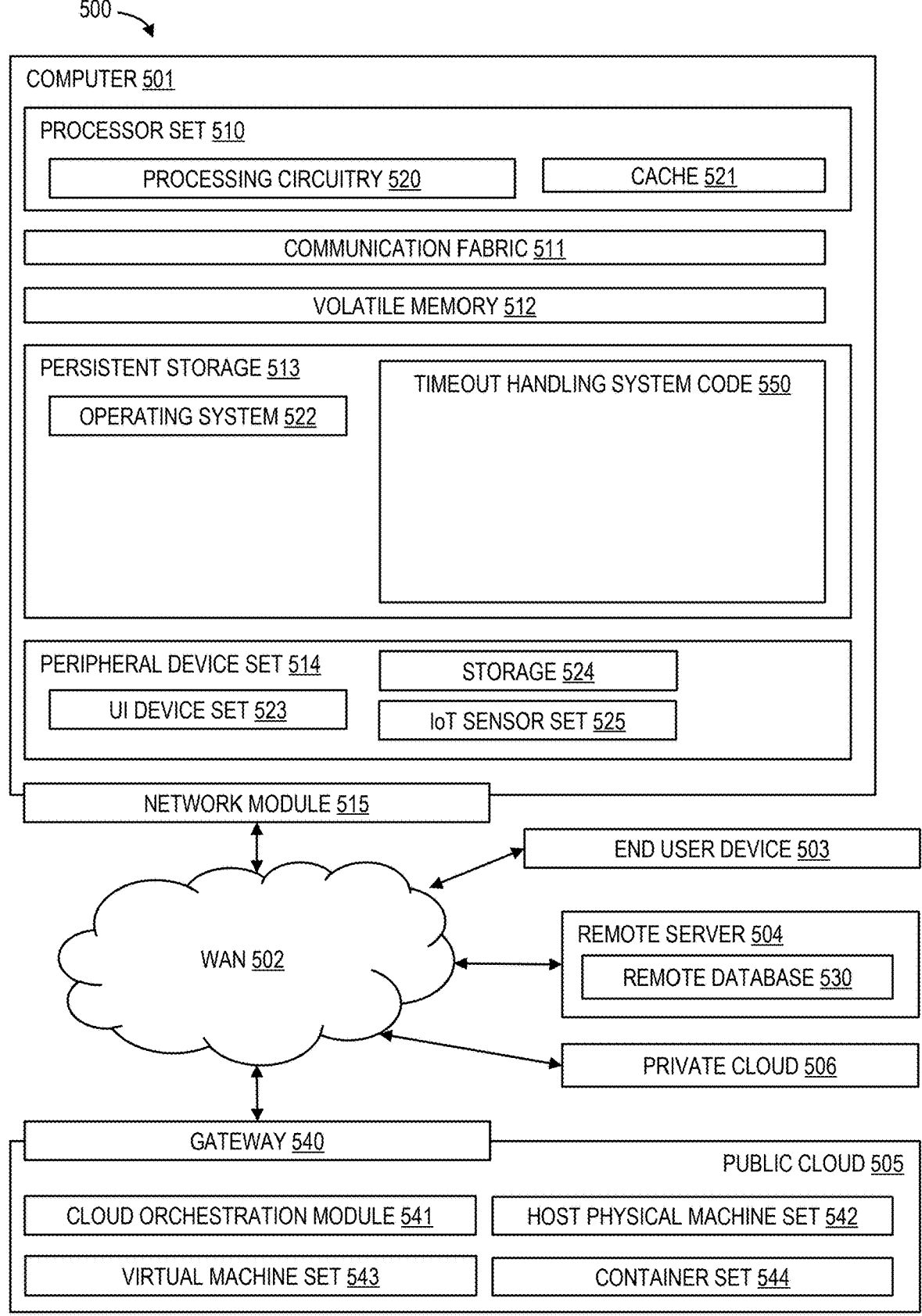
FIG. 5 is a block diagram of an example embodiment of a computing environment for the execution of at least some of the computer code involved in performing the present invention.

Referring to FIG. 5, computing environment 500 contains an example of an environment for the execution of at least some of the computer code involved in performing the inventive methods, such as timeout handling system code 550. In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface-type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501) and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

The invention claimed is:

1. A computer-implemented method for handling timeouts of client requests to a server, the method carried out by the server, the method comprising:

accessing timeout metadata of a synchronous client request at a server queue;

determining that the synchronous client request has a timeout risk;

identifying a response storage location for a request processor to use to store a response to the synchronous client request when the response is provided after a timeout of the synchronous client request;

responding to the synchronous client request indicating a use of the response storage location for asynchronous response retrieval; and providing an identifier of the response storage location as metadata in the synchronous client request when sending the synchronous client request to the request processor for processing, wherein the identifier includes credentials of a client for authentication of the client when retrieving the response to the synchronous client request.

2. The method of claim 1, further comprising:

monitoring a plurality of synchronous client requests in the server queue and ordering the plurality of synchronous client requests in the server queue based on a time remaining until the timeout of each of the synchronous client requests.

3. The method of claim 1, wherein determining that the synchronous client request has the timeout risk includes analyzing a current server response capability.

4. The method of claim 1, wherein responding to the synchronous client request indicating a use of a response storage request responds with the identifier of the response storage location for the asynchronous response retrieval.

5. The method of claim 1, further comprising:

creating the response storage location with an authentication requirement for authentication of a client when retrieving an asynchronous response.

6. The method of claim 1, wherein the response storage location is provided on a separate server to a request processing server.

7. The method of claim 1, further comprising:

updating a state of the response storage location between multiple different states of the response at the response storage location.

8. The method of claim 1, further comprising:

deleting the response from the response storage location once retrieved by the client.

9. The method of claim 1, further comprising:

monitoring the response storage location and deleting a response after a predetermined time.

10. A computer-implemented method for handling timeouts of client requests to a server, said method carried out at a client, the method comprising:

sending a synchronous client request to a server queue, wherein a client request includes timeout metadata;

receiving a holding response to the client request, with the holding response including an indication of a use of a response storage location for the server to use to store a response to the client request when the response is provided after a timeout of the client request;

obtaining an identifier of the response storage location, wherein the identifier includes credentials of a client for authentication of the client;

authenticating the client at the response storage location in order to retrieve the response; and accessing the response storage location for asynchronous response retrieval.

11. The method of claim 10, further comprising:

empowering the client to use the response storage location to retrieve the response in a predefined time window.

12. The method of claim 10, further comprising:

repeatedly attempting to retrieve the response from the response storage location until it is available at the response storage location.

13. A system for handling timeouts of client requests to a server, comprising:

a server system including a processor and a memory configured to provide computer program instructions to the processor to execute a method of:

accessing timeout metadata of a synchronous client request at a server queue;

determining that the synchronous client request has a timeout risk;

identifying a response storage location for a request processor to use to store a response to the synchronous client request when the response is provided after a timeout of the synchronous client request;

responding to the synchronous client request indicating a user of the response storage location for asynchronous response retrieval; and providing an identifier of the response storage location as metadata in the synchronous client request when sending the synchronous client request to the request processor for processing, wherein the identifier includes credentials of a client for authentication of the client when retrieving the response to the synchronous client request.

14. The system of claim 13, wherein the method includes:

monitoring the client requests in the server queue and ordering the client requests in the server queue based on a time remaining until each of the client requests timeouts.

15. The system of claim 13, wherein determining that the synchronous client request has the timeout risk includes analyzing a current server response capability.

16. The system of claim 13, wherein the method includes:

creating the response storage location with client credentials for authentication of the client when retrieving the response.

17. The system of claim 14, wherein the method includes:

monitoring the response storage location and deleting a response after a predetermined time.

18. The system of claim 13, further comprising:

a client system including a processor and a memory configured to provide computer program instructions to the processor to execute a method of:

sending the synchronous client request to the server queue, wherein the synchronous client request includes the timeout metadata;

receiving a holding response to the synchronous client request, with the holding response including an indication of a use of the response storage location for the request processor to use to store a response to the synchronous client request when the response is provided after the timeout of the synchronous client request;

obtaining an identifier of the response storage location; and accessing the response storage location for the asynchronous response retrieval.

19. The system of claim 18, wherein the method includes:

empowering a client to use the response storage location to retrieve the response in a predefined time window.

\* \* \* \* \*